United States Patent
Jessop (10) Patent No.: US 8,601,837 B2
(45) Date of Patent: Dec. 10, 2013

(54) MACHINE AND METHOD FOR HAIR OR BRISTLE REMOVAL

(75) Inventor: Israel Jessop, Annandale, NJ (US)

(73) Assignee: LifeCell Corporation, Branchburg, NJ (US)

( * ) Notice: Subject to any disclaimer, the term of this patent is extended or adjusted under 35 U.S.C. 154(b) by 47 days.

(21) Appl. No.: 13/252,344

(22) Filed: Oct. 4, 2011

(65) Prior Publication Data

US 2012/0079857 A1  Apr. 5, 2012

Related U.S. Application Data

(60) Provisional application No. 61/389,791, filed on Oct. 5, 2010.

(51) Int. Cl.
*C14B 15/02* (2006.01)

(52) U.S. Cl.
USPC .............................................. 69/26

(58) Field of Classification Search
USPC .......... 69/20, 24, 26; 452/82, 83, 84, 85, 102; 606/133
See application file for complete search history.

(56) References Cited

U.S. PATENT DOCUMENTS

| | | | | |
|---|---|---|---|---|
| 754,382 A | * | 3/1904 | Mills | 69/26 |
| 2,480,252 A | * | 8/1949 | Magnus | 606/133 |
| 2,516,374 A | * | 7/1950 | Eisen | 69/20 |
| 2,531,209 A | * | 11/1950 | Gilbert | 69/26 |
| 2,599,621 A | * | 6/1952 | Fisher | 452/93 |
| 2,618,811 A | * | 11/1952 | Fisher | 452/84 |
| 2,683,976 A | * | 7/1954 | Howarth | 69/26 |
| 2,764,885 A | * | 10/1956 | Eisen | 69/26 |
| 2,788,651 A | * | 4/1957 | Qwarnstrom | 69/20 |
| 3,468,141 A | * | 9/1969 | Soleanicov et al. | 69/20 |
| 3,911,530 A | * | 10/1975 | Kalfsbeek et al. | 452/83 |
| 4,279,253 A | * | 7/1981 | Haes et al. | 606/133 |
| 4,825,867 A | * | 5/1989 | Gross et al. | 606/133 |
| 4,923,463 A | * | 5/1990 | Nussbaum | 606/133 |
| 5,007,915 A | * | 4/1991 | Nussbaum | 606/133 |
| 5,135,430 A | * | 8/1992 | Jordan et al. | 452/86 |
| 5,149,295 A | | 9/1992 | Bowling et al. | |
| 5,261,919 A | * | 11/1993 | Niedertscheider | 606/133 |
| 5,669,916 A | | 9/1997 | Anderson | |
| 6,478,493 B1 | | 11/2002 | Cepeda et al. | |
| 8,105,340 B2 | * | 1/2012 | Grieshaber et al. | 606/133 |
| 2001/0014579 A1 | | 8/2001 | Potter et al. | |
| 2002/0031994 A1 | | 3/2002 | Potter et al. | |
| 2002/0173260 A1 | | 11/2002 | Potter et al. | |

(Continued)

FOREIGN PATENT DOCUMENTS

| DE | 101 28 783 | 3/2003 |
|---|---|---|
| EP | 1 534 098 B1 | 6/2006 |

(Continued)

OTHER PUBLICATIONS

International Search Report and Written Opinion for PCT/US2011/054691 mailed Mar. 9, 2012, from the International Searching Authority of the European Patent Office.

*Primary Examiner* — Shaun R Hurley
(74) *Attorney, Agent, or Firm* — McCarter & English, LLP; Matthew R. Van Eman (57) ABSTRACT

Devices and methods for removal of animal hair are provided. The devices and methods can include one or more rotating bodies that form pinch regions for mechanical removal of animal hair.

34 Claims, 10 Drawing Sheets

(56) References Cited

U.S. PATENT DOCUMENTS

| | | |
|---|---|---|
| 2003/0073399 A1 | 4/2003 | Potter et al. |
| 2004/0204721 A1* | 10/2004 | Lee ............................... 606/133 |
| 2007/0043383 A1 | 2/2007 | Grieshaber et al. |
| 2007/0208354 A1 | 9/2007 | Barraclough et al. |
| 2007/0225733 A1 | 9/2007 | Barraclough et al. |

FOREIGN PATENT DOCUMENTS

| | | |
|---|---|---|
| FR | 2 245 314 | 4/1975 |
| FR | 2 307 491 | 11/1976 |
| GB | 1155873 | 6/1969 |
| GB | 2 020 548 | 11/1979 |
| WO | WO 2005/002387 A1 | 1/2005 |

* cited by examiner

MACHINE AND METHOD FOR HAIR OR BRISTLE REMOVAL

This application claims priority under 35 U.S.C. §119 to U.S. Provisional Patent Application No. 61/389,791, which was filed on Oct. 5, 2010, and which is herein incorporated by reference.

Animal tissues, including animal skin, can be used to produce a variety of tissue products for patient use. However, the skin of many animals includes thick hair or bristles, which must be removed to produce certain products suitable for use in the human body. Because animal hair is often thicker and more strongly bound to animal skin, removal of animal hair cannot be easily performed using normal waxes or other procedures that are effective for removal of human hair. Further, in the food industry, relatively high-temperature processes (e.g., exposure to hot water) are used to remove animal hair, but because the high temperatures may alter the extracellular matrix of the tissues, such processes may not be suitable for removal of hair from tissues destined for use in medical or surgical tissue products.

Accordingly, there is a need for improved methods for removal of hair or bristles from animal skin for production of medical devices such as acellular tissue matrices.

SUMMARY

According to certain embodiments, a device for removal of hair or bristles from an animal is provided. The device comprises a first cylindrical body having a longitudinal axis and a second cylindrical body having a longitudinal axis, wherein the first cylindrical body and second cylindrical body are positioned proximate to one another and can rotate about their respective longitudinal axes in opposite directions. The device further comprises at least one flexible sheet of material wrapped about a portion of the first cylindrical body in a first direction relative to the longitudinal axes of the cylindrical bodies and also wrapped about a portion of the second cylindrical body in a second direction opposite the first direction such that as the first cylindrical body rotates in the first direction and the second cylindrical body rotates in the second direction, an elongated pinch point is formed between the flexible sheet and the second cylindrical body.

According to certain embodiments, a device for removal of hair or bristles from an animal is provided. The device comprises a first cylindrical body having a longitudinal axis and a second cylindrical body having a longitudinal axis, wherein the first cylindrical body and second cylindrical body are positioned proximate to one another and can rotate about their respective longitudinal axes in opposite directions. The device further comprises a first flexible sheet of material wrapped about a portion of the first cylindrical body and a second flexible sheet of material wrapped about a portion of the second cylindrical body, wherein the first flexible sheet and second flexible have interlocking textured surfaces that form an elongated pinch point to produce a pulling force on an object positioned between the first and second cylindrical bodies as the first and second cylindrical bodies rotate in opposite directions about their respective longitudinal axes.

According to certain embodiments, a device for removal of hair or bristles from an animal is provided. The device comprises a guide member having a substantially flat, rigid lower surface, and a leading forward edge, the leading forward edge having a bottom portion comprising a sharp angle and a top portion comprising a blunt curve directed away from the leading forward edge. The device further comprises at least one gripping surface, wherein the gripping surface is rotatably mobile such that the gripping surface passes proximate to the blunt curve to form a pinch region between a top surface of the guide member and the gripping surface.

According to certain embodiments, a device suitable for removal of hair or bristles from animal skin is provided. The device comprising a first cylindrical body; a second cylindrical body wherein the first cylindrical body and second cylindrical body are positioned proximate to one another such that they are able to form an elongated pinch point to produce a pulling force on an object positioned between the first and second cylindrical bodies when the first and second cylindrical bodies rotate in opposite directions about their respective longitudinal axes.

According to certain embodiments, methods of removing hair or bristle from skin or animal hides are provided. The methods can include selecting a skin or animal hide having hair or bristle; and operating any of the devices according to the present disclosure to remove hair or bristle from the skin or animal hide. In addition, skin or animal hides having hair or bristle removed according to such methods, along with processed products made from such skin or animal hides, are provided.

DESCRIPTION OF CERTAIN EXEMPLARY EMBODIMENTS

Reference will now be made in detail to certain exemplary embodiments according to the present disclosure, certain examples of which are illustrated in the accompanying drawings. Wherever possible, the same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including", as well as other forms, such as "includes" and "included", is not limiting. Any range described herein will be understood to include the endpoints and all values between the endpoints.

The section headings used herein are for organizational purposes only and are not to be construed as limiting the subject matter described. All documents, or portions of documents, cited in this application, including but not limited to patents, patent applications, articles, books, and treatises, are hereby expressly incorporated by reference in their entirety for any purpose.

As used herein, the terms "hair" and "bristle" will be used interchangeably to refer to animal hair or any hair-like structure that grows from animal skin.

Human and animal tissues can be used to produce a variety of tissue products for patient use. For example, human and animal dermis can be used to produce a variety of useful medical devices or tissue products. Such products can include, for example, reconstituted skin grafts and acellular tissue matrix products. Examples of such acellular tissue matrix products include ALLODERM®, which is a freeze-dried acellular human dermal tissue matrix, CYMETRA®, a particulate acellular human dermal tissue matrix, and STRATTICE™, a porcine acellular dermal matrix, all of which are produced by LifeCell Corporation, Branchburg, N.J.

In order to produce suitable tissue products from animal skin, it is necessary to remove certain portions of the skin, including hair or bristles. However, manual removal of animal hair can be very time consuming. In addition, other known methods for removal of animal hair can adversely affect the underlying tissues, thereby rendering the tissues less effective when implanted in a patient. For example, in the food industry, pig bristles are often removed using a process that includes scalding with hot liquids, and although that process is effective, elevated temperatures can damage the underlying tissue by denaturing or otherwise altering the extracellular matrix.

In addition, known methods for mechanical removal of hair or feathers from humans or other animals are not effective for removal of certain animal hair. For example, typical waxes or other methods used to mechanically pluck hair from humans will not generate enough pulling force to remove coarse, tightly bound bristles from animals such as pigs. Accordingly, there is a need for improved, efficient, and rapid methods of removal of relatively large amounts of tightly bound hair from animals to allow further processing for production of medical devices, such as acellular tissue matrix products. In some embodiments, the methods allow removal of the entire hair, including plucking of the root.

The devices and methods provide automated systems for removal of hair or bristles. The systems provide mechanical devices that include moving parts that create an elongated pinch point or region that produces a continuous pulling force on hair or bristles positioned within the pinch point. The pinch point is designed to provide sufficient friction and/or pulling force to allow removal of coarse or tightly bound hairs.

Figure 1:
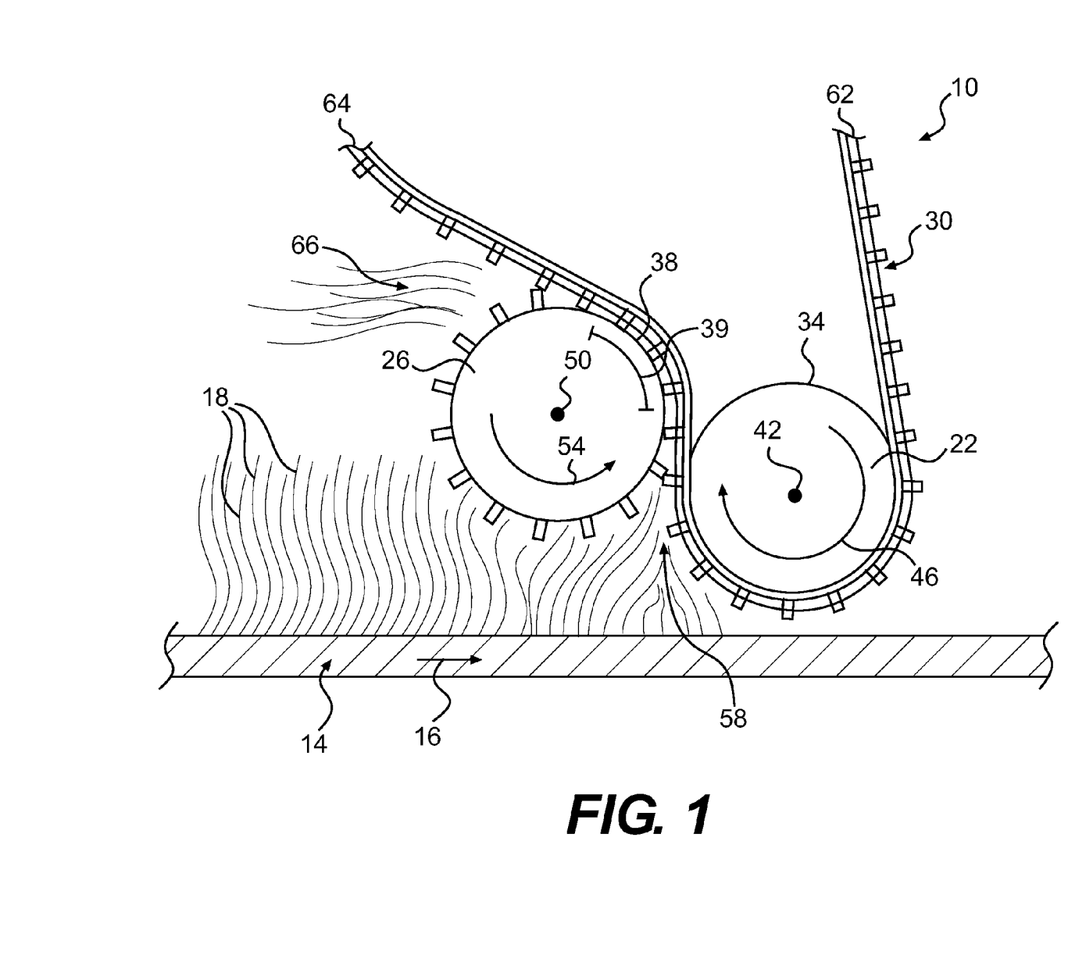
FIG. 1 is a side view of a device for animal hair removal, according to certain embodiments.

FIG. 1 is a side view of a device 10 for removal of hair or bristles from an animal. The device 10 comprises a first substantially cylindrical body 22 having a longitudinal axis 42 and a second substantially cylindrical body 26 having a longitudinal axis 50, wherein the first cylindrical body 22 and second cylindrical body 26 are positioned proximate to one another and can rotate about their respective longitudinal axes 42, 50 in opposite directions 46, 54. The device 10 further comprises at least one flexible sheet of material 30 wrapped about a portion of the first cylindrical body 22 in a first direction 46 about its longitudinal axis and also wrapped about a portion of the second cylindrical body 26 in a second direction 54 opposite the first direction 46 such that as the first cylindrical body 22 rotates in the first direction 46 about its longitudinal axis 42 and the second cylindrical body 26 rotates in the second direction 54, an elongated pinch point 58 is formed between the flexible sheet of material 30 and the second cylindrical body 26. In certain embodiments, the elongated pinch point has a length 39 that provides gripping or pulling on hair over a length of the hair 18.

During operation, the device 10 can be used to remove hair or bristles 18 from an animal's skin or hide 14. The hide 14 may have been removed from an animal carcass, as shown, or can still be attached to an animal carcass. The hide 14 can be laid on a flat surface to allow the device 10 to be passed over various regions of the hide 14 to remove bristles 18 from the hide 14. Alternatively, the hide 14 can be positioned on a moving surface such as a conveyor belt (not shown). Further, in some embodiments, the pinch point 58 is directed upward/outward in another direction, and the hide 14 is held, e.g., by an operator or machine, such that the bristles 18 contact the pinch point 58.

In general terms, the device 10 removes hair or bristles 18 by pinching the hair or bristles 18 at pinch point 58 while first cylindrical body 22 and second cylindrical body 26 rotate about their respective axes 42, 50 in opposite directions. Continued rotation of the cylindrical bodies 22, 26 produces a pulling force on bristles 18 trapped within pinch point 58, thereby producing sufficient mechanical force to pull bristles 18 free from hide 14. In certain embodiments, device 10 can generate sufficient force to pull entire bristles from hide 14, including the bristle roots.

In various embodiments, the surfaces 34, 38 and/or materials from which the cylindrical bodies 22, 26 and/or flexible sheet of material 30 are made are configured to improve gripping and pulling of hair or bristles 18. For example, in various embodiments, either or both of the first or second cylindrical bodies 22, 26, and/or flexible sheet of material 30, can have a textured surface configured to increase friction on bristles 18. In certain embodiments, the textured surfaces 34, 38 of cylindrical bodies 22, 26 and/or flexible sheet of material 30 can comprise toothed, abrasive, or knobby surfaces. In some embodiments, a surface 38 of second cylindrical body 26 can include teeth or textures configured to interlock/interdigitate with the surface of flexible sheet 30. In certain embodiments, the flexible sheet can include a compressible polymer or other compressible material, which may or may not have a textured surface 38.

The flexible sheet of material 30 can be produced from a variety of different materials having various configurations. For example, in some embodiments, a timing belt is used. For example, a suitable timing belt can include a double-sided MXL timing belt, having approximately 1 mm-2 mm pitch, but other timing belts with varying pitches can be used. Suitable belts can include, for example, a polyurethane belt, which may be reinforced with KEVLAR® or nylon fibers. In other embodiments, the flexible sheet 30 is produced from a flexible polymeric material, flexible metal (e.g., steel ribbon), rubber (e.g., moderate durometer plactic/elastomer with or without reinforcement), sandpaper, emery cloth, or abrasive textiles. In addition, in some embodiments, the sheet of material 30 has a relatively smooth surface, but forms a textured surface due to underlying textures or teeth on the surface of first cylindrical body 22. Further, the flexible sheet of material 30 can have teeth and/or ridges on both sides, and such teeth and/or ridges can facilitate gripping of one or more drive rollers or cylinders, as described further below.

In addition, the cylindrical bodies 22, 26 (and additional cylindrical bodies described with reference to other embodiments below) can have a variety of configurations to improve gripping and pulling of hair or bristles. For example, the cylindrical bodies 22, 26 can generally include any elongated roller produced from a hard metal, polymer, ceramic, or other suitable structural material. In addition, the cylindrical bodies 22, 26 can have a length, as measured along their longitudinal axes 42, 50 that is selected based on a particular application. For example, a small handheld device may have cylindrical bodies 22, 26 with a length of 1 to several inches. However, longer cylindrical bodies 22, 26 may be used to allow hair removal from larger hides, and/or with more automated systems. For example, suitable lengths may be up to 3 feet, 4 feet, or longer depending on the size of the hide 14 to be treated.

In addition, the diameters and relative positions of the cylindrical bodies 22, 26 can be selected based on the desired application. For example, as shown in FIG. 1, the cylindrical bodies 22, 26 are of relatively equal diameter, and the second cylindrical body 26 is slightly higher than first cylindrical body relative to a feed direction 16 of the hide 14. However, in other embodiments, the cylindrical bodies 22, 26 can by higher or lower relative to a feed direction, or can be coplanar relative to a feed direction.

The combination of the flexible sheet 30 and cylindrical bodies 22, 26 can facilitate gripping and removal of hair. Specifically, the elongated pinch point 58 can be configured to have a sufficient depth to allow gripping of hair over a desired length. For example, as shown in FIG. 1, the sheet 30 contacts the surface 38 of the second cylindrical body over a certain depth 39. The depth 39 provides an extended gripping length to allow secure gripping and pulling of hairs, which could not be pulled using rollers alone.

In some embodiments, the diameters of cylindrical bodies can be selected to allow removal of hair having a minimum length. For example, as shown in FIGS. 1-4 and 6-7, rollers 22, 26 are of approximately equal diameter and can include a diameter of 0.2-0.5 in., 0.2-0.4 in., about 0.3-0.35 in., or any values within those ranges. Further, the specific sizes can be varied based on the length and coarseness of hair to be removed. For example, for longer and/or more coarse hair, larger rollers may be used, and for smaller and/or finer hairs, smaller rollers may be used. In certain embodiments, the roller sizes are selected based on a minimum bristle length to be removed. For example, with equally sized rollers, the minimum bristle length can be estimated as approximately two times the pitch of a timing belt used for flexible sheet 30, but those values may vary based on material used for flexible sheet 30 and other design considerations.

The device 10 can be powered in a number of ways. For example, most generally, the cylindrical bodies 22, 26 will simply need to rotate in opposite directions 46, 54 relative to their respective longitudinal axes to produce a pulling force along the elongated pinch point 58 between the flexible sheet 30 and the second cylindrical body 26, thereby ejecting pulled hairs 66. This may be accomplished by driving one or both of the cylindrical bodies 22, 26 with a motor to move the bodies and flexible sheet and/or by movement of the flexible sheets, e.g., by connections at distal portions 62, 64 on flexible sheet to move the sheet and cylindrical bodies 22, 26 (e.g., in a back-and-forth motion or through a loop described further below).

Figure 2:
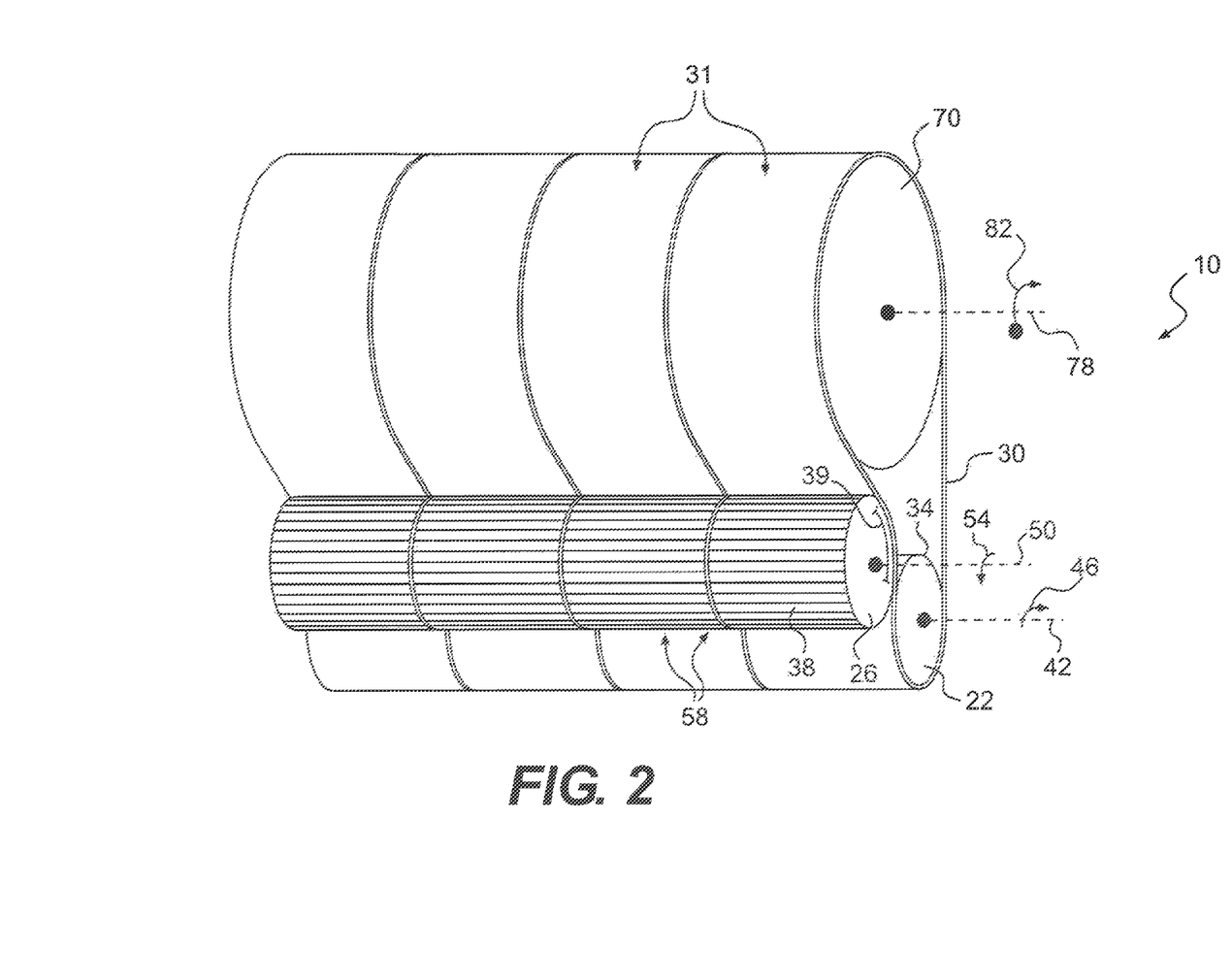
FIG. 2 is a perspective view of a device for animal hair removal, according to another exemplary embodiment.

In certain embodiments, the device 10 includes one or more additional cylindrical bodies such that the flexible sheet 30 forms a loop for continuous movements. For example, FIG. 2 is a perspective view of a device for animal hair removal, according to another exemplary embodiment. As shown in FIG. 2, the device 10 further comprises at least one additional cylindrical body 70 contacting the flexible sheet. Further, the additional cylindrical body 70 includes a longitudinal axis 78 about which the additional cylindrical body 70 can rotate in a direction 82. The flexible sheet 30 is in contact with the surface of the additional cylindrical body 70 such that the flexible sheet forms a loop that is in contact with each of the first cylindrical body 22, second cylindrical body 26, and at least one additional cylindrical body 70.

In some embodiments, the additional cylindrical body 70 will have a diameter that is greater than the diameters of the first 22 and second 26 cylindrical bodies. In addition, the additional cylindrical body 70 may be operatively connected to a motor or other drive mechanism to cause movement of the flexible sheet 30 and rotation of the first 22 and second 26 cylindrical bodies, to produce a pulling force at an elongated pinch point 58. The relative sizes of each of the cylindrical bodies 22, 26, 70 may be selected to control machine performance, e.g., to provide mechanical advantage to the cylindrical bodies attached to a motor or drive mechanism and/or to control the gripping force and/or dimensions of the pinch point 58.

Figure 3:
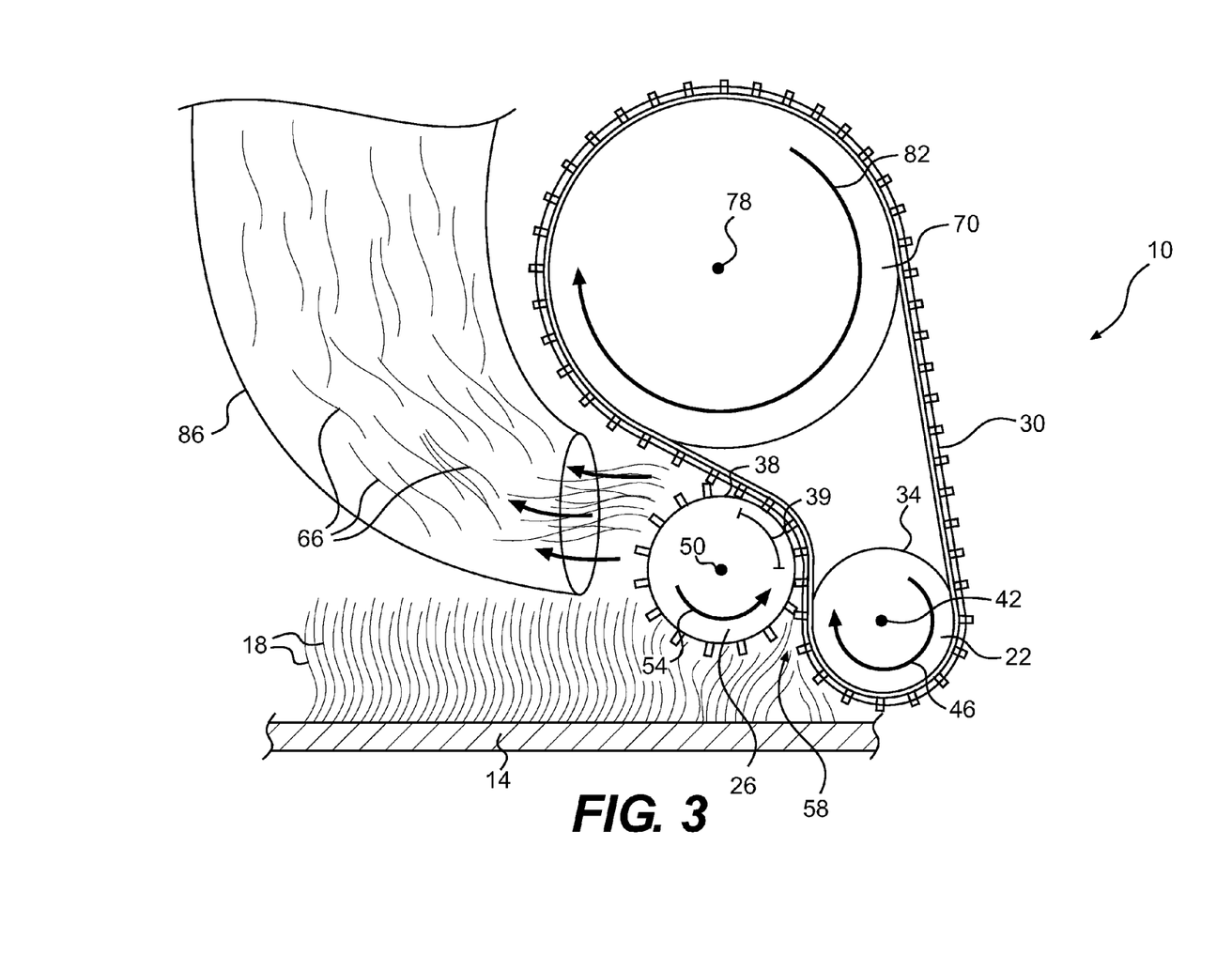
FIG. 3 is a side view of a device for animal hair removal, according to certain embodiments.

The device 10 may further include various additional components to facilitate efficient, rapid, and/or automatic hair or bristle removal. For example, FIG. 3 is a side view of a device for animal hair removal, according to certain embodiments. As shown, the device of FIG. 3 is similar to the device of FIG. 2, but further includes a vacuum system 86 for automatic removal of ejected hair or bristles 66 during device operation.

Figure 4:
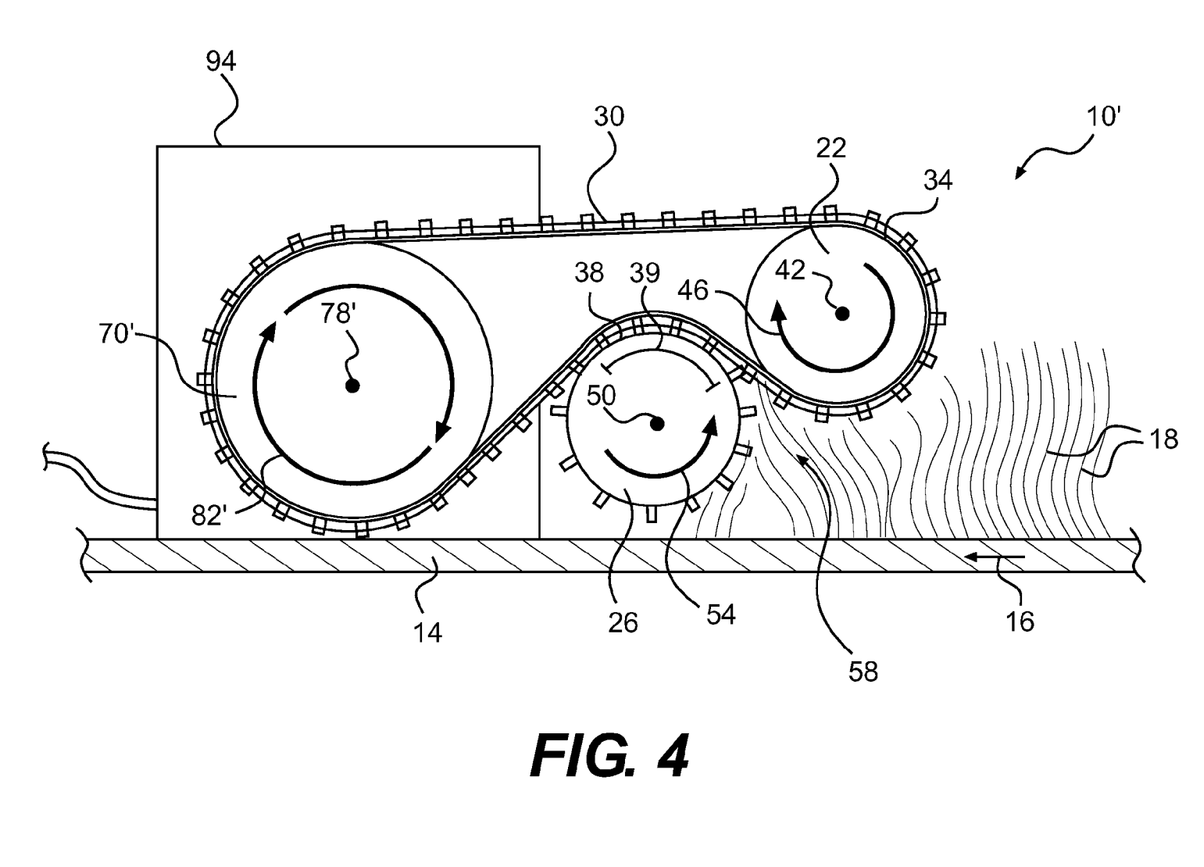
FIG. 4 is a side view of a device for animal hair removal, according to certain embodiments.

In addition, the devices of the present disclosure can include systems for automatic movement or feeding of hides 14 to allow automated or semi-automated processing. For example, FIG. 4 is a side view of a device 10' for animal hair removal, according to certain embodiments. Device 10' of FIG. 4 is similar to device 10 of FIGS. 2 and 3. However, device 10' has been modified, such that the additional cylindrical body 70' is positioned to act as both a drive-roller and a feeding mechanism. Specifically, by rotation about its axis 78' in a first direction 82', the cylindrical body 70' drives movement of the flexible sheet 30 and first and second cylindrical bodies 22, 26 to allow capture and removal of bristles 18 at pinch point 58. In addition, cylindrical body 70' is positioned such that its movement draws hide 14 through device 10', thereby providing an automatic feed mechanism in a feed direction 16. The hide may also be moved using an automated feed system such as a conveyor belt.

As described above, the cylindrical body 70' and/or any other cylindrical bodies (see, e.g., FIG. 5) can be operatively connected to a motor 94 or other drive mechanism to provide power to device 10' (or any other devices described with reference to the various figures). A variety of suitable power sources or motors 94 can be used, including for example, an electric or gas-powered motor. In general, the power source 94 and configuration of cylindrical bodies 22, 26, 70, 70' (and or other cylindrical bodies, if any) will be selected to produce a sufficient pulling force at elongated pinch point 58 to allow removal of a desired type or thickness of hair. For example, for pig bristle or other coarse animal hair, a sufficient torque should be produced to provide at least 20 lbs. of pulling force per inch along the length of pinch point 58. However, the amount of force needed can vary based on the density of hair to be removed, speed of removal, and/or coarseness of hair. Accordingly, in various embodiments, the force produced at the pinch point can be between about 8 lbs. per inch to about 35 lbs. per inch. In various embodiments, the force can be between 8 lbs. per inch to 20 lbs per inch, between 15 lbs. per inch to 20 lbs per inch, between 20 lbs. per inch to 30 lbs per inch, between 30 lbs. per inch to 25 lbs per inch, at least 10 lbs. per inch, at least 15 lbs. per inch, at least 20 lbs. per inch, at least 25 lbs. per inch, at least 30 lbs. per inch, at least 35 lbs. per inch, or at least 40 lbs. per inch.

Figure 5:
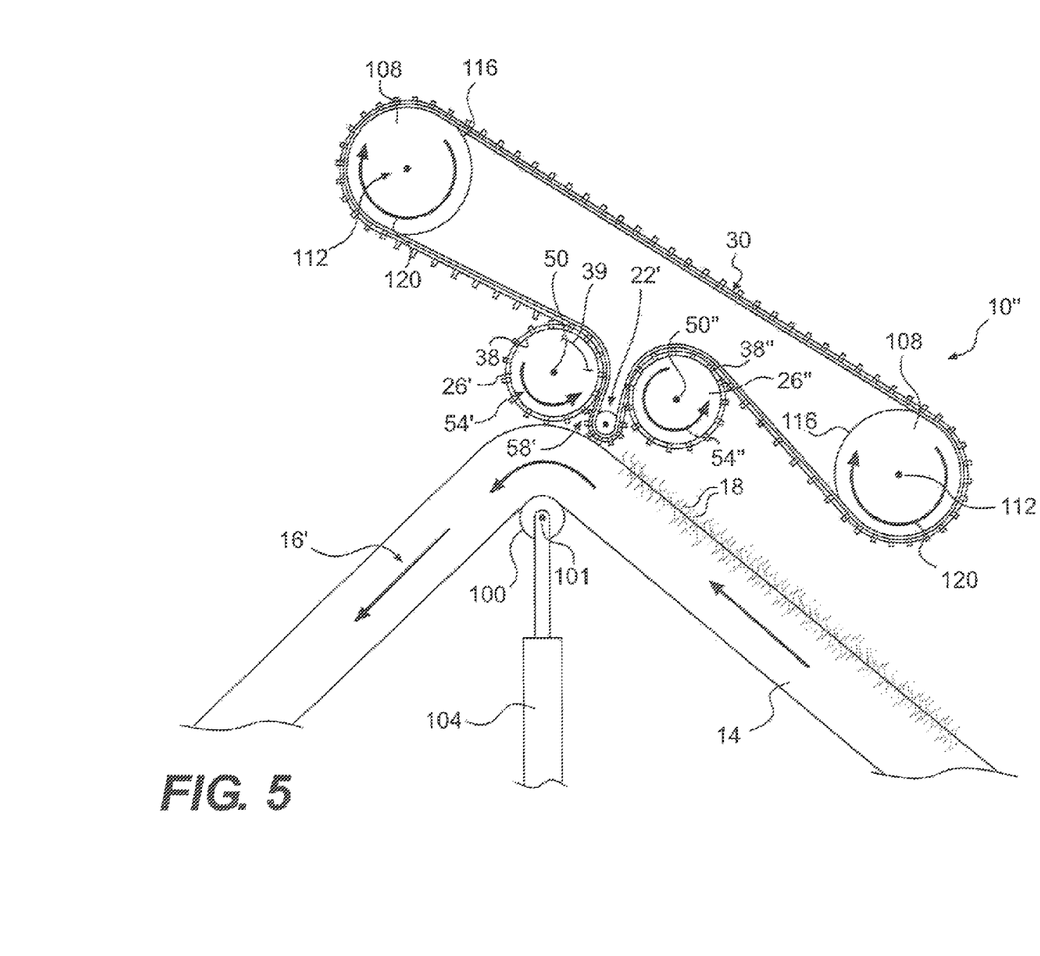
FIG. 5 is a side view of a device for animal hair removal, according to certain embodiments.

FIG. 5 is a side view of a device for animal hair removal, according to certain embodiments. The device 10" illustrates several other variations that may be incorporated in the devices 10, 10', described above. As noted above, in some embodiments, the hide 14 can be placed on a flat surface such as a table or conveyor belt during hair or bristle removal. However, in some embodiments, it may be desirable to alter the shape of the hide 14 to assist in presenting the hair or bristle for removal. For example, in some embodiments, the hide 14 may be bent and/or biased towards a pinch point during hair removal. Accordingly, in some embodiments, the device 10" (or 10, 10', or other devices and embodiments described herein) may include a rod member 100 positioned proximate the elongated pinch point 58' and extending substantially parallel to the longitudinal axes of the first 22' and second 26' cylindrical bodies. During hair or bristle removal, the hide 14 may be bent over the rod member 100 to more fully expose bristles 18.

The rod member 100 can include a variety of shapes, but will generally include a relatively low diameter cylindrical rod, which may be rotatable about its longitudinal axis 101. Further, in order to maintain the hide in contact with the pinch point 58', the rod member 100 can include a biasing mechanism 104, such as a spring. In some embodiments, the rod member 100 can be configured to rotate or roll along an axis 101, and the hide 14 can be pulled or fed along a direction 16', to allow remove of bristles along the hide 14.

In addition, FIG. 5 illustrates various other features that may be included in device 10". For example, as noted above, the first cylindrical body 22' and second cylindrical body 26' may have different diameter. Specifically, as shown, the first cylindrical body 22' has a diameter that is less than a diameter of the second cylindrical body 26'. In various embodiments, the diameters of the cylindrical bodies 22' and 26' are selected to allow gripping and removal of hairs with as short of a length as possible. For example, in one suitable embodiment, first cylindrical body 22' has a diameter of about ⅛ in. to about 3/16 in., and second cylindrical body has a diameter of about ⅜ in, to about 0.5 in. Further, the specific sizes can be varied based on the length and coarseness of hair to be removed. For example, for longer and/or more coarse hair, larger rollers may be used, and for smaller and/or finer hairs, smaller rollers may be used. In certain embodiments, the roller sizes are selected based on a minimum bristle length to be removed. For example, with a smaller roller 22' and larger roller 26', the lower limit of hair length that can be removed will be about ⅔ the diameter of the smaller roller 22', but those values may vary based on material used for flexible sheet 30 and other design considerations.

Further, as noted above, device 10" can include one or more additional cylindrical bodies 26" and 116. As shown, one additional or third cylindrical body 26" is positioned opposite second cylindrical body 26' with respect to first cylindrical body 22'. In some embodiments, the two bodies 26', 26" positioned on opposite sides of the first cylindrical body 22' act as driver rollers, and are operatively connected to a motor to power device 10'. Both bodies 26" and 26" rotate in a common direction, 54', 54" about axes 50, 50" to drive the device 10'.

In addition, two additional cylindrical bodies 116 are provided. The additional cylindrical bodies 116 are in contact with the flexible sheet 30 and can rotate in a first direction 120 about their longitudinal axes 112, which is the same as the direction of rotation 56 of first body 22'. In some embodiments, the additional bodies 116 act to provide tension to the flexible sheet 30 to ensure adequate contact with the other cylindrical bodies. In some embodiments, the at least two additional cylindrical bodies 116 have an adjustable position with respect to the first, second, and third cylindrical bodies 22', 26', 26" to allow control of the tension in the flexible sheet 30.

In some embodiments, devices 10, 10', 10", or 10''' (FIG. 6) can include multiple sheets of flexible material to produce elongated pinch points for hair or bristle removal. For example, as shown in FIG. 2, sheet 30 can be formed from multiple sheets 31 positioned side by side and wrapped about the respective cylindrical bodies in the same manner. (FIG. 6).

In other embodiments, the devices can include multiple sheets wrapped in varying arrangements. For example, FIG. 6 is a perspective view of components of a device for animal hair removal, according to certain embodiments. As shown, the device 10''' of FIG. 6, is similar to the device 10 of FIG. 2, but includes multiple sheets 30-33 wrapped in different directions relative to the axes of the cylindrical bodies 22, 26. Specifically, the device 10''' includes at least one first sheet 30, 32 wrapped about a portion of a first cylindrical body 22 in a first direction 46 and also wrapped about a portion of a second cylindrical body 26 in a second direction 54 such that as the first cylindrical body 22 rotates in the first direction 46 and the second cylindrical body 26 rotates in the second direction 54, one or more elongated pinch points 58 are formed between the flexible sheet of material 58 and the second cylindrical body 26.

In addition, the device 10''' further includes at least one additional flexible sheet of material 31, 33 wrapped about a portion of the first cylindrical body 22 in the second direction 54 and also wrapped about a portion of the second cylindrical body in the first direction 46 such that as the first cylindrical body 22 rotates in the first direction 46 and the second cylindrical body 26 rotates in the second direction 54, at least one additional elongated pinch point 59 is formed between the flexible sheet 31, 33 and the first cylindrical body. As described above, the pinch points 58, 59 can be designed to have a sufficient depth 39, 39' to allow gripping of hair or bristles over an extended length on the hair or bristles.

Figure 6:
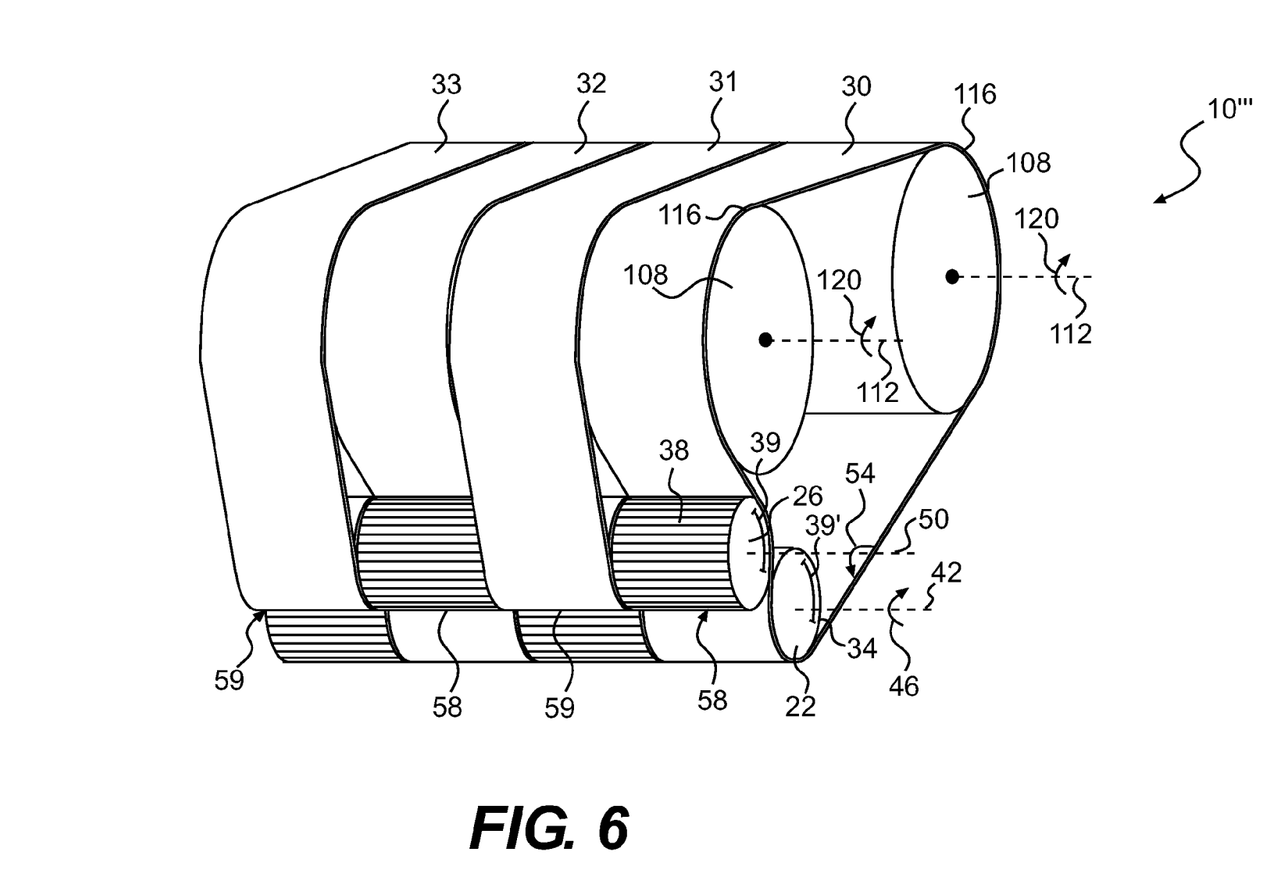
FIG. 6 is a perspective view of components of a device for animal hair removal, according to certain embodiments.

As described with respect to various embodiments above, the device 10''' of FIG. 6 can also include a number of additional cylindrical bodies 108. The flexible sheets of material 30-33 can be wrapped around the additional cylindrical bodies 108 to form a loop(s). The cylindrical bodies 108 can further be operatively connected to a drive mechanism, such as an electric motor, so that rotation of either or both of the additional cylindrical bodies 108 with provide power to device 10'''. In addition, as described above, one or both of cylindrical bodies 108 can have an adjustable position with respect to first and second cylindrical bodies 22, 26 to allow adjustment of tension in the flexible sheets of material 30-33.

Figure 7:
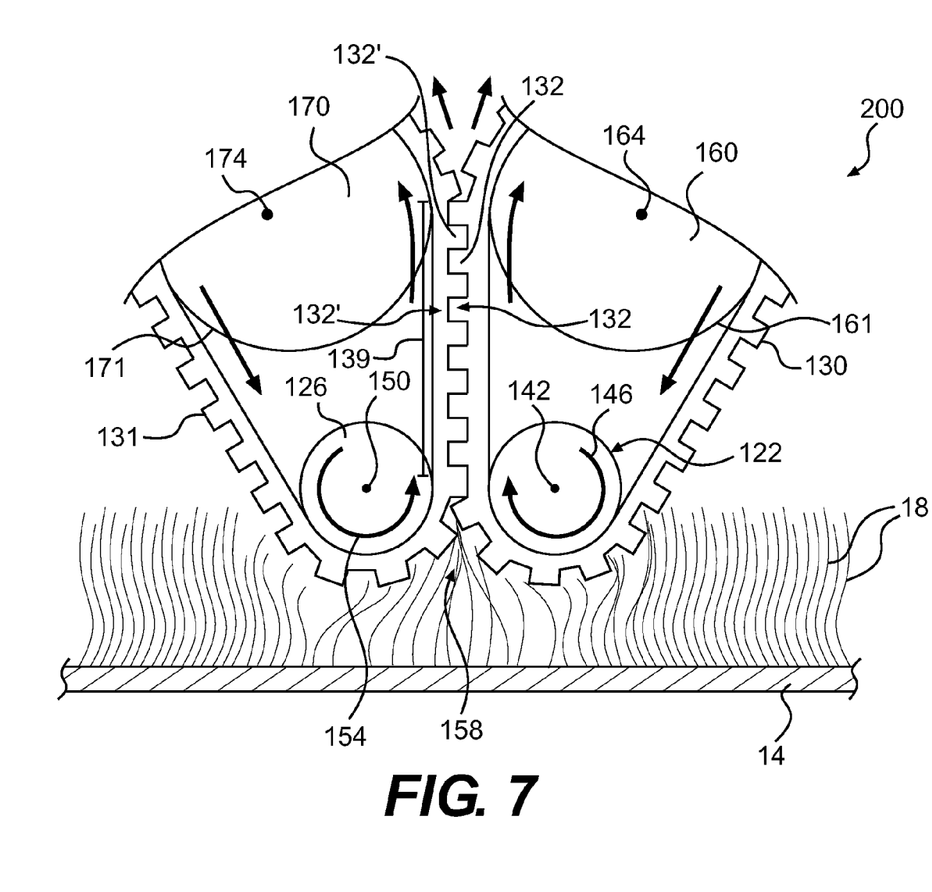
FIG. 7 is a side view of a device for animal hair removal, according to another exemplary embodiment.

In some embodiments, multiple flexible sheets can be used to produce a pinch point for hair or bristle removal. For example, FIG. 7 is a side view of a device 200 for animal hair removal, according to another exemplary embodiment. As shown, the device 200 can include a first cylindrical body 122 having a longitudinal axis 142 and a second cylindrical body 126 having a longitudinal axis 150, wherein the first cylindrical body 122 and second cylindrical body 126 are positioned proximate to one another and can rotate about their respective longitudinal axes 142, 150 in opposite directions 146, 154. The device can also include a first flexible sheet of material 130 wrapped about a portion of the first cylindrical body 122 and a second flexible sheet of material 131 wrapped about a portion of the second cylindrical body 126 to form an elongated pinch point 158 (extending into the page of FIG. 7). The elongated pinch point 158 can produce a pulling force on an object positioned between the first 122 and second 126 cylindrical bodies as the first 122 and second 126 cylindrical bodies rotate in opposite directions 146, 154 about their respective longitudinal axes.

In addition, as described with reference to other embodiments, the elongated pinch point 158 can be designed to have a certain depth, to allow gripping of hair or bristles over an extended length. Specifically, as shown, the device 200 is configured to provide a pinch point 158 with a certain depth 139 formed between sheets 130, 131.

In certain embodiments, the flexible sheets 130, 131 have a textured surface selected to improve gripping and pulling of animal hair or bristles 18 from an animal hide 14. For example, in various embodiments, the textured surfaces 132, 132' are interlocking toothed surfaces.

As with other embodiments described above, the device 200 can further include additional cylindrical bodies to produce rotating loops of sheets 130, 132, to attach to a power source to drive device 200, and/or to allow control of the tension in sheets 130, 131. For example, in some embodiments, the device 200 further includes a third cylindrical body 160, wherein the first flexible sheet 130 forms a loop between the first cylindrical body 122 and the third cylindrical body 160. In addition, the device can include a fourth cylindrical body 170, wherein the second flexible sheet 131 forms a loop between the second cylindrical body 126 and the fourth cylindrical body 170. As the third and fourth cylindrical bodies 160, 170 rotate in opposite directions 161, 171 about their respective axes 164, 174 the loops formed by sheets 130, 131 drive the motion of the first and second cylindrical bodies 122, 126. In some embodiments, one or both of third and fourth cylindrical bodies 160, 170 are operatively connected to a power source. In some embodiments, the power source is configured to rotate the cylindrical bodies and produce a torque sufficient to generate at least 20 lbs. per inch along the elongated pinch point 158.

Figure 8:
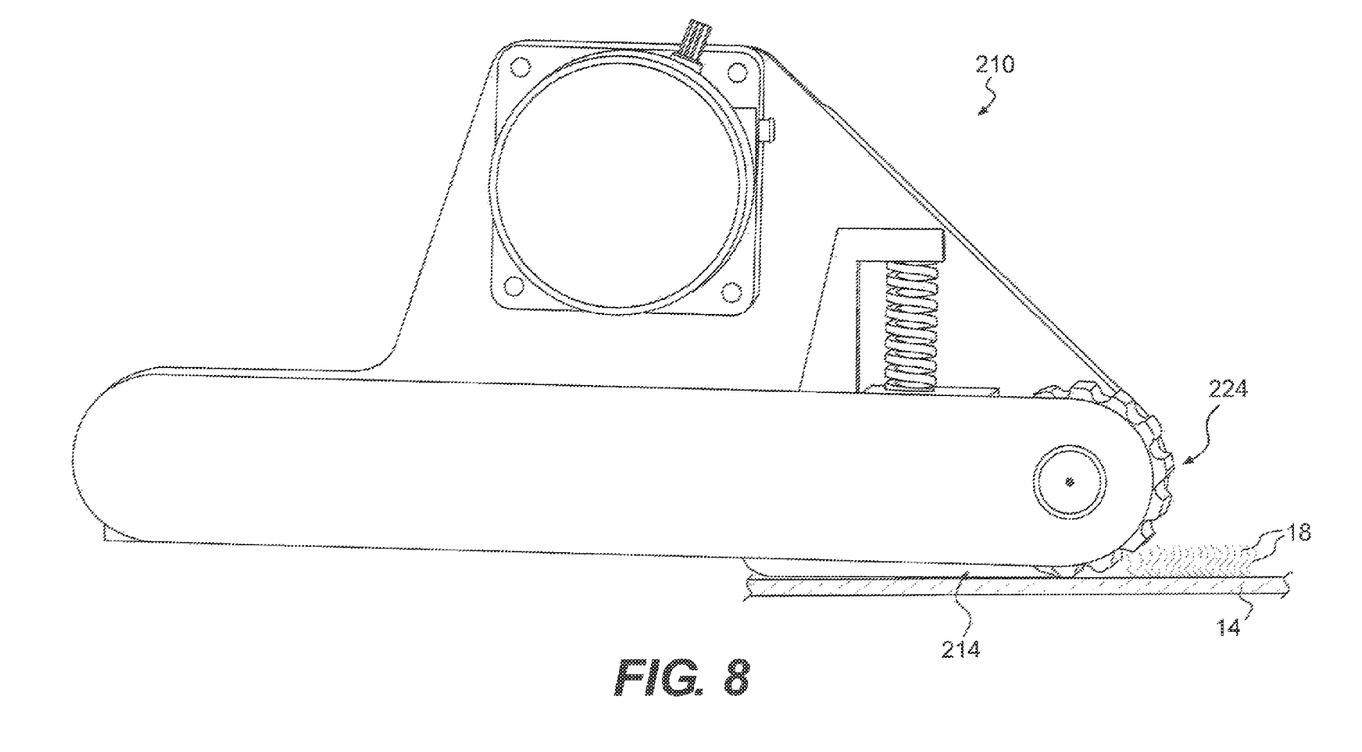
FIG. 8 is a side view of a device for animal hair removal, according to another exemplary embodiment.
Figure 9:
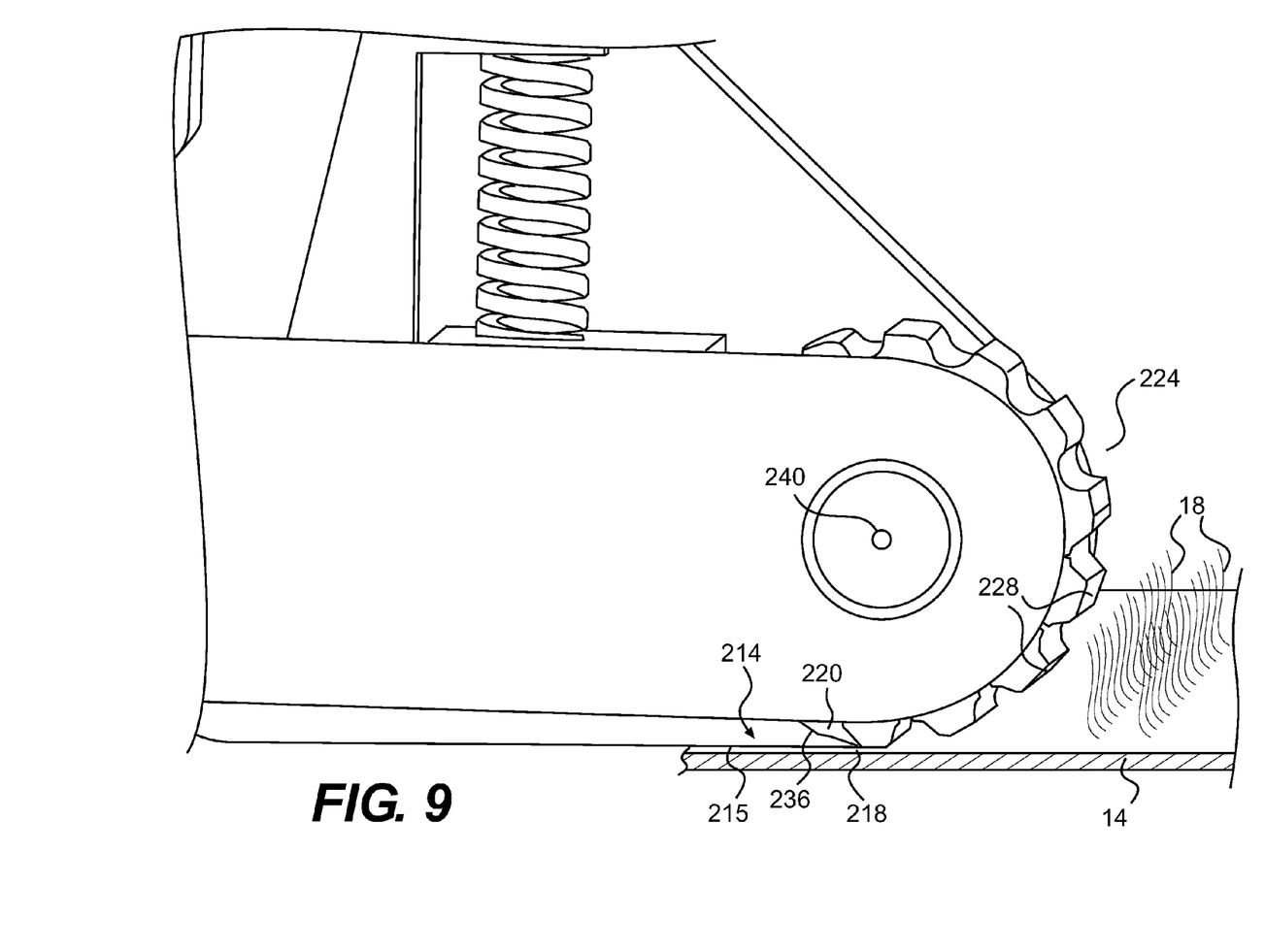
FIG. 9 is an enlarged perspective view of a portion of the device of FIG. 8.
Figure 10:
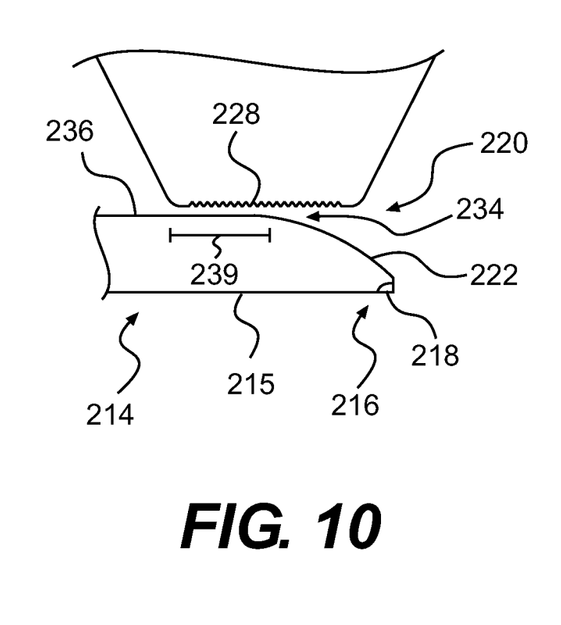
FIG. 10 is an enlarged side view of a portion of the device of FIG. 8.

The present disclosure also provides devices for removing hair without use of a flexible sheet. For example, FIG. 8 is a side view of a device 210 for animal hair removal, according to another exemplary embodiment. FIG. 9. is an enlarged perspective view of an end portion of the device 200, and FIG. 10. is an enlarged side view of the end portion of the device 200. As shown, the device 210 comprises a guide member 214 having a substantially flat, rigid lower surface 215 and a leading forward edge 216 (shown in FIG. 10). In some embodiments, the leading forward edge 216 has bottom portion 218 comprising a sharp angle (e.g., 80-90°, 70-90°, or any values within those ranges) and a top portion 220 comprising a blunt curve 222 directed away from the leading forward edge 216. The device 210 further includes at least one gripping surface 228 that is rotatably mobile such that the gripping surface 228 passes proximate to the blunt curve 222 of the top surface 220 to form a pinch region 234 (as shown in FIG. 10) between a top surface 236 of the guide member 214 and the gripping surface 228. For example, as shown, the device 210 can include a rotatable wheel 224 having a plurality of gripping surfaces 228, which may be approximately evenly spaced about an axis 240 of the wheel 224. The wheel 224 can rotate about the axis 240 to allow continuous pulling of hair at pinch region 234.

The at least one gripping surface 228 can be configured to provide sufficient friction or gripping force to allow hair or bristle trapped at the pinch region 234 to be pulled from a hide 14. For example, in some embodiments, the at least one gripping surface 228 comprises a textured surface. Further, to provide durability, the surfaces can be produced from a hard metal such as a textured steel. In addition, the top surface 220 of the guide member 214 can comprise a smooth metal surface to allow bristles 18 to be smoothly pulled into pinch region 234. Further, the dimensions of the gripping surface 228 and top surface 236 can be selected such that the pinch region 234 has a certain depth 239 to provide gripping of hair or bristles over a certain length.

As noted above, the devices of the present disclosure can be passed along the surface of a hide to allow removal of hair or bristles from the hide. In some embodiments, it may be desirable to move the hide or devices in a certain direction with respect to one another. For example, it may be beneficial or more efficient to move the devices or hide such that the devices move against the grain of hair or bristles to assist in exposing hairs to and capturing hairs at pinch points formed in the devices. In addition, the devices can include two or more sets of devices arranged in series. In some embodiments, the devices arranged in series can be aligned in opposite orientations to allow efficient capture of hairs or bristles growing in varying directions. In certain embodiments, two or more devices are used to allow removal of hair of varying lengths. For example, in certain embodiments, a first device having a larger roller diameter is used to remove large and/or coarse hair. In certain embodiments, a second device having smaller rollers is used to remove hair having a shorter length and/or reduced density. In certain embodiments, multiple devices are used to remove hairs of multiple lengths. In some embodiments, two or more devices are incorporated into a single machine. In other embodiments, the multiple devices are provided as separate machines.

According to certain embodiments, methods of removing hair or bristle from skin or animal hides are provided. The methods can include selecting a skin or animal hide having hair or bristle; and operating any of the devices according to the present disclosure, as described above, in the figures, or in the claims, to remove hair or bristle from the skin or animal hide. In addition, skin or animal hides having hair or bristle removed according to such methods, along with processed products made from such skin or animal hides, are provided.

It will be understood that the above description of preferred embodiments is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the scope of this invention.

What is claimed is:

1. A device for removal of hair or bristles from an animal, comprising:
    a first cylindrical body having a longitudinal axis;
    a second cylindrical body having a longitudinal axis, wherein the first cylindrical body and second cylindrical body are positioned proximate to one another and can rotate about their respective longitudinal axes in opposite directions;
    at least one flexible sheet of material wherein the sheet comprises at least one of a surface comprising teeth and a textured surface, and wherein the sheet is wrapped about a portion of the first cylindrical body in a first direction relative to the longitudinal axes of the cylindrical bodies and also wrapped about a portion of the second cylindrical body in a second direction opposite the first direction such that as the first cylindrical body rotates in the first direction and the second cylindrical body rotates in the second direction, an elongated pinch point is formed between the flexible sheet and the second cylindrical body.

2. The device of claim 1, wherein the second cylindrical body comprises a surface including teeth.

3. The device of claim 1, wherein the second cylindrical body comprises a textured surface.

4. The device of claim 1, wherein the flexible sheet comprises a surface including teeth.

5. The device of claim 1, wherein the wherein the flexible sheet comprises a textured surface.

6. The device of claim 1, wherein the first cylindrical body comprises a surface including teeth.

7. The device of claim 1, wherein the first cylindrical body comprises a textured surface.

8. The device of claim 1, further comprising at least one additional cylindrical body contacting the flexible sheet.

9. The device of claim 8, wherein the at least one additional cylindrical body is capable of rotating about its longitudinal axis in the first direction; and wherein the flexible sheet is in contact with the surface of the additional cylindrical body such that the flexible sheet forms a loop that is in contact with each of the first, second, and at least one additional cylindrical bodies.

10. The device of claim 9, wherein the at least one additional cylindrical body includes at least two cylindrical bodies, each in contact with the flexible sheet and capable of rotating about their longitudinal axes.

11. The device of claim 10, wherein the at least two cylindrical bodies have an adjustable position with respect to the first and second cylindrical bodies.

12. The device of claim 1, wherein the first cylindrical body has a diameter that less than a diameter of the second cylindrical body.

13. The device of claim 12, further including a third cylindrical body, wherein the first cylindrical body is placed between the second and third cylindrical bodies, and wherein the flexible sheet is in contact with a surface of the third cylindrical body.

14. The device of claim 1, further including a rod member positioned proximate the elongated pinch point and extending substantially parallel to the longitudinal axes of the first and second cylindrical bodies.

15. The device of claim 14, wherein the rod member includes a cylindrical rod.

16. The device of claim 15, wherein the cylindrical rod has a longitudinal axis about which the cylindrical rod can rotate.

17. The device of claim 15, wherein the rod member is operatively engaged with a spring member configured to bias the rod member towards the elongated pinch point.

18. The device of claim 14, further including at least one additional cylindrical body having a longitudinal axis and being capable of rotating about its longitudinal axis in the first direction; and wherein the flexible sheet is in contact with the surface of the additional cylindrical body such that the flexible sheet forms a loop that is in contact with each of the first, second, and at least one additional cylindrical bodies.

19. The device of claim 18, wherein the at least one additional cylindrical body includes at least two cylindrical bodies, each in contact with the flexible sheet and capable of rotating clockwise about their longitudinal axis.

20. The device of claim 1, further including a power source operatively connected to at least one of the cylindrical bodies to rotate the cylindrical bodies about their longitudinal axes.

21. The device of claim 20, wherein the power source is configured to rotate the cylindrical bodies and produce a torque sufficient to generate at least 20 pounds per inch along the elongated pinch point.

22. The device of claim 18, further including a power source operatively connected to at least one of the cylindrical bodies to rotate the cylindrical bodies about their longitudinal axes.

23. The device of claim 22, wherein the power source is configured to rotate the cylindrical bodies and produce a torque sufficient to generate at least 20 pounds per inch along the elongated pinch point.

24. The device of claim 1, wherein the at least one flexible sheet of material comprises multiple flexible sheets of material positioned proximate one another.

25. The device of claim 1, further including at least one additional flexible sheet of material wrapped about a portion of the first cylindrical body in the second direction and also wrapped about a portion of the second cylindrical body in the first such that as the first cylindrical body rotates in the first direction and the second cylindrical body rotates in the second direction, at least one additional elongated pinch point is formed between the flexible sheet and the first cylindrical body.

26. The device of claim 1, wherein the flexible sheet contacts the surface of the second cylindrical body over at least 120° of a circumference of the second cylindrical body.

27. A device for removal of hair or bristles from an animal, comprising:
a first cylindrical body having a longitudinal axis;
a second cylindrical body having a longitudinal axis, wherein the first cylindrical body and second cylindrical body are positioned proximate to one another and can rotate about their respective longitudinal axes in opposite directions;
a first flexible sheet of material wrapped about a portion of the first cylindrical body; and
a second flexible sheet of material wrapped about a portion of the second cylindrical body, wherein the first flexible sheet and second flexible have interlocking textured surfaces that form an elongated pinch point to produce a pulling force on an object positioned between the first and second cylindrical bodies as the first and second cylindrical bodies rotate in opposite directions about their respective longitudinal axes.

28. The device of claim 27, wherein the textured surfaces of the first cylindrical body and second cylindrical body are interlocking toothed surfaces.

29. The device of claim 28, further including a third cylindrical body, wherein the first flexible sheet forms a loop between the first cylindrical body and the third cylindrical body.

30. The device of claim 29, further including a fourth cylindrical body, wherein the second flexible sheet forms a loop between the second cylindrical body and the fourth cylindrical body.

31. The device of claim 27, further including a power source operatively connected to at least one of the cylindrical bodies to rotate the cylindrical bodies about their longitudinal axes.

32. The device of claim 31, wherein the power source is configured to rotate the cylindrical bodies and produce a torque sufficient to generate at least 20 pounds per inch along the elongated pinch point.

33. A device suitable for removal of hair or bristles from animal skin, comprising:
a first cylindrical body at least one flexible sheet of wherein the sheet comprises at least one of a surface comprising teeth and a textured surface, and wherein the sheet is wrapped about a portion of the first cylindrical body in a first direction relative to longitudinal axes of the cylindrical bodies; and a second cylindrical body wherein the first cylindrical body and second cylindrical body are positioned proximate to one another such that they are able to form an elongated pinch point to produce a pulling force on an object positioned between the first and second cylindrical bodies when the first and second cylindrical bodies rotate in opposite directions about their respective longitudinal axes.

34. A method for removing hair or bristle from skin, comprising:

selecting a device comprising:

a first cylindrical body;

at least one flexible sheet of material wherein the sheet comprises at least one of a surface comprising teeth and a textured surface, and wherein the sheet is wrapped about a portion of the first cylindrical body in a first direction relative to the longitudinal axes of the cylindrical bodies;

a second cylindrical body, wherein the first cylindrical body and second cylindrical body are positioned proximate to one another such that they are able to form an elongated pinch point to produce a pulling force on an object positioned between the first and second cylindrical bodies when the first and second cylindrical bodies rotate in opposite directions about their respective longitudinal axes; and positioning a skin or animal hide having hair or bristle proximate the elongated pinch point to remove hair or bristle from the skin or animal hide.

\* \* \* \* \*